(12) United States Patent
Fang et al.

(10) Patent No.: US 9,806,985 B2
(45) Date of Patent: Oct. 31, 2017

(54) SYMMETRIC ROUTING ENFORCEMENT

(71) Applicant: CISCO TECHNOLOGY, INC., San Jose, CA (US)

(72) Inventors: Zhiyong Fang, ChongQing (CN); Yuping Wang, Shanghai (CN); Linyu Lu, Shanghai (CN); Yin Wang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 258 days.

(21) Appl. No.: 14/635,972

(22) Filed: Mar. 2, 2015

(65) Prior Publication Data

US 2016/0261486 A1 Sep. 8, 2016

(51) Int. Cl.
*H04L 12/715* (2013.01)
*H04L 12/751* (2013.01)
*H04L 12/723* (2013.01)

(52) U.S. Cl.
CPC .............. *H04L 45/04* (2013.01); *H04L 45/02* (2013.01); *H04L 45/50* (2013.01)

(58) Field of Classification Search
CPC ....................................................... H04L 45/04
See application file for complete search history.

(56) References Cited

U.S. PATENT DOCUMENTS

| | | | |
|---|---|---|---|
| 7,080,161 B2 | 7/2006 | Leddy et al. | |
| 8,121,136 B2 | 2/2012 | Asati et al. | |
| 8,139,572 B1* | 3/2012 | Distler | H04L 45/04 370/389 |
| 8,488,470 B2 | 7/2013 | Scudder et al. | |
| 8,634,428 B2 | 1/2014 | Le Pennec et al. | |
| 2002/0069292 A1* | 6/2002 | Gaddis | H04M 15/00 709/238 |
| 2002/0184393 A1 | 12/2002 | Leddy et al. | |
| 2004/0208175 A1* | 10/2004 | McCabe | H04L 45/04 370/389 |
| 2006/0092950 A1* | 5/2006 | Arregoces | H04L 45/24 370/396 |

(Continued)

FOREIGN PATENT DOCUMENTS

WO    WO 99/14907    3/1999

OTHER PUBLICATIONS

EPO Jul. 20, 2016 Search Report and Written Opinion from European Application Serial No. EP16154576.

*Primary Examiner* — Andrew Chriss
*Assistant Examiner* — Voster Preval

(57) ABSTRACT

A method enabling symmetric routing between a first host within a first AS and a second host within a second AS is disclosed. The method includes detecting that a first routing message was received at an edge router of the first AS from an edge router of the second AS. The first message identifies the second host as a source and the first host as a destination of a forward route. The method further includes determining that the first message further comprises an indication to implement symmetric routing between the first and second hosts and generating a second routing message for propagating to router(s) within the first AS. The second message identifies the first host as a source and the second host as a destination of a return route, and indicates that data is to be sent via the edge router of the first AS that received the first message.

18 Claims, 10 Drawing Sheets

(56) References Cited

U.S. PATENT DOCUMENTS

| | | | |
|---|---|---|---|
| 2006/0198298 A1* | 9/2006 | Bhogavilli | H04L 45/00 370/229 |
| 2008/0098127 A1* | 4/2008 | Engel | H04L 12/5695 709/238 |
| 2010/0329153 A1* | 12/2010 | Xu | H04L 41/082 370/254 |
| 2011/0069714 A1* | 3/2011 | Le Pennec | H04L 45/00 370/401 |
| 2011/0096668 A1* | 4/2011 | Bloch | H04L 45/38 370/237 |
| 2012/0093154 A1* | 4/2012 | Rosenberg | H04L 45/04 370/392 |
| 2013/0206040 A1 | 8/2013 | Zhang et al. | |

\* cited by examiner

RM1: SrcPrefix=2.2.2.2/32
Srcport = any
DstPrefix=1.1.1.1/32
DstPort = 80
NextHop= Branch-R2
Obit    = 1

RM2: SrcPrefix=1.1.1.1/32
Srcport = 80
DstPrefix=2.2.2.2/32
DstPort = any
NextHop= HUB-R2
Obit    = 1

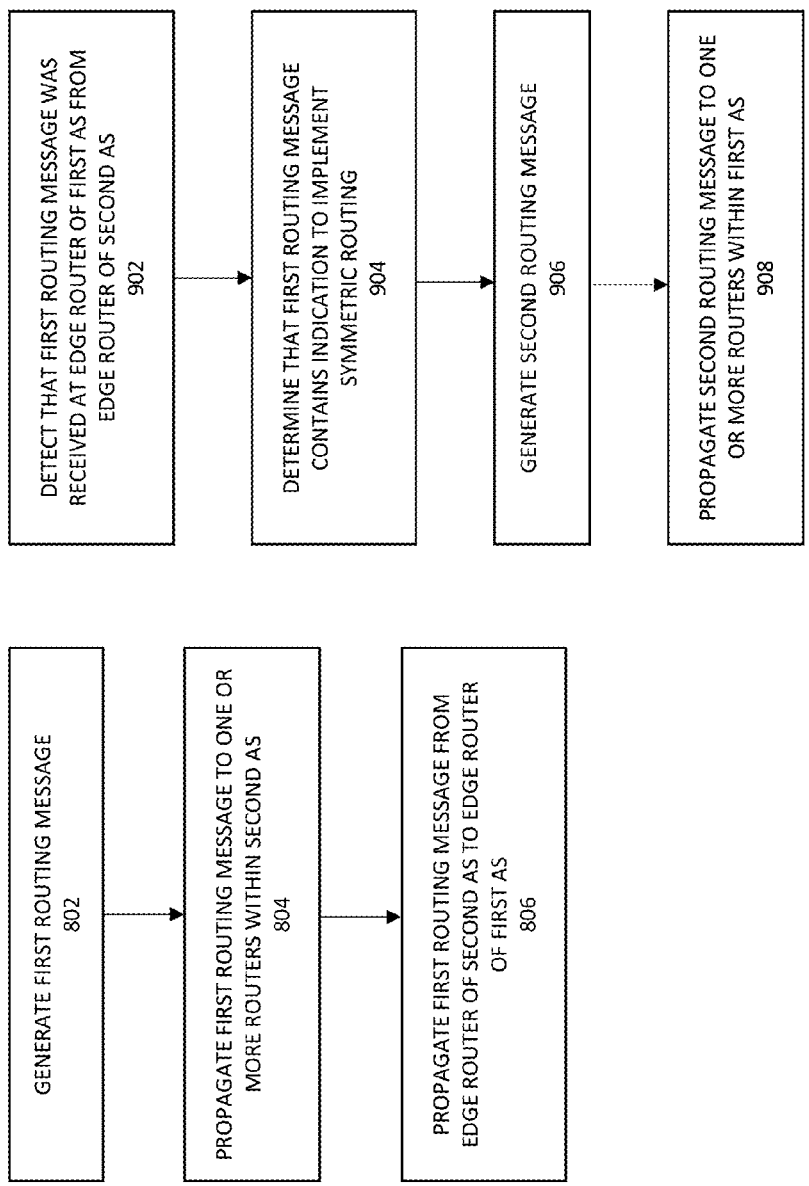

SYMMETRIC ROUTING ENFORCEMENT

TECHNICAL FIELD

This disclosure relates in general to the field of communications and, more particularly, to methods and systems for assisting in ensuring symmetric routing between a first host and a second host of different autonomous systems, the methods and systems particularly suitable for use with a Border Gateway Protocol.

BACKGROUND

In hop-by-hop packet routing systems, which make up the vast majority of current Internet Protocol (IP) routing systems, each router independently selects the outgoing path for the communications. "Asymmetric routing" refers to a situation when traffic does not traverse the same path in both directions of a conversation. While routing protocols ensure that loops are avoided, the symmetry of bidirectional traffic flows cannot be guaranteed when destination prefixes are reachable by multiple paths. In fact, asymmetric routing is inherent in IP networks because it is often beneficial for the path decision to be unidirectional, e.g. in order to minimize state and maximize performance.

However, asymmetric routing can create problems in the network for network features and services that need to act on both directions of the flow. Some examples of such features and services include firewalls, stateful features such as e.g. Network Address Translation (NAT), and other inspection features such as e.g. Network-Based Application Recognition (NBAR) and Application Response Time (ART). When packets following one routing path to go from client to server, but another routing path to return to the client from the server, such features and services may be compromised or even completely dysfunctional.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 is a flow diagram of a method for assisting in ensuring symmetric routing between host in different ASs, performed on the side of a source AS of a forward route, according to an embodiment of the present disclosure;

FIG. 9 is a flow diagram of a method for assisting in ensuring symmetric routing between host in different AS's, performed on the side of a destination AS of a forward route, according to an embodiment of the present disclosure;

DETAILED DESCRIPTION OF EXAMPLE EMBODIMENTS

Overview

Figure 1:
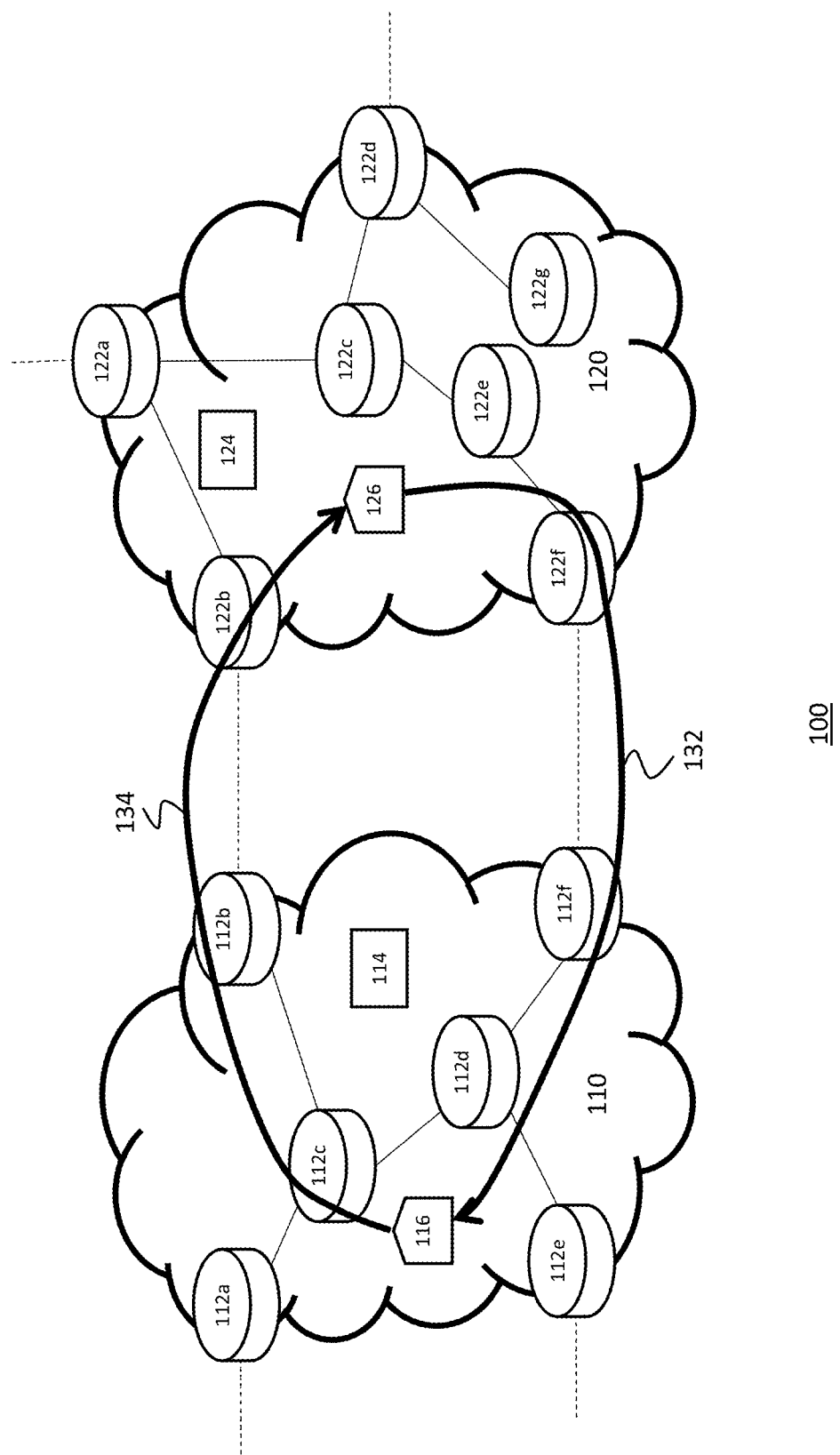
FIG. 1 is a simplified schematic diagram illustrating a network comprising multiple AS's.

In one aspect, embodiments presented herein may relate to a first computer-implemented method for assisting in ensuring symmetric routing between a first host and a second host. The first host is a part of a first autonomous system (AS) and the second host is a part of a second AS. The first method includes detecting that a first routing message was received at an edge router of the first AS from an edge router of the second AS (i.e., the first routing message was received over an inter-AS routing protocol, e.g. an exterior gateway protocol such as Border Gateway Protocol (eBGP)). The first routing message includes an identification of the second host as a source of a forward route and an identification of the first host as a destination of the forward route. The first method further includes determining that the first routing message further comprises an indication to implement symmetric routing between the first host and the second host and generating a second routing message for propagating to one or more routers within the first AS (i.e., for propagating the second routing message over an intra-AS routing protocol, e.g. an interior gateway protocol such as interior Border Gateway Protocol (iBGP)). The second routing message includes an identification of the first host as a source of a return route, an identification of the second host as a destination of the return route, and an indication that data from the first host to the second host is to be sent via the edge router of the first AS that received the first routing message.

In an embodiment, the first method further includes propagating the second routing message to the one or more routers within the first AS.

In another aspect, embodiments presented herein may relate to a second computer-implemented method for assisting in ensuring symmetric routing between a first host and a second host as described above. The second method includes generating a first routing message for propagating from an edge router of the second AS to an edge router of the first AS (i.e., propagating the first routing message over an inter-AS routing protocol, e.g. an exterior gateway protocol such as eBGP). The first routing message includes an identification of the second host as a source of a forward route, an identification of the first host as a destination of the forward route, and an indication to implement symmetric routing between the first host and the second host.

In an embodiment of the second method, the indication to implement symmetric routing may trigger, or enable, generation of a second routing message, within the first AS, for propagating to one or more routers within the first AS (i.e., for propagating the second routing message over an intra-AS routing protocol, e.g. an interior gateway protocol such as iBGP). The second routing message may include an identification of the first host as a source of a return route, an identification of the second host as a destination of the return route, and an indication that data from the first host to the second host is to be sent via the edge router of the first AS that received the first routing message.

In an embodiment, the second method may further include a step of propagating the first routing message from the edge router of the second AS to the edge router of the first AS (i.e., for propagating the first routing message over an inter-AS routing protocol such as e.g. eBGP).

In an embodiment, the second method may further include a step of propagating the first routing message to one or more routers within the second AS (i.e., for propagating the first routing message over an intra-AS routing protocol such as e.g. iBGP).

In an embodiment of either the first or the second method, the first routing message may comprise or be an update message of an inter-domain routing protocol, e.g. the update message providing network layer reachability information (NLRI). In one further embodiment of either the first or the second method, such inter-domain routing protocol could be BGP, in particular eBGP and the indication to implement symmetric routing between the first host and the second host could comprises a predefined value being encoded within a traffic-action value field of the update message, in particular a predefined value being encoded within type 0x8007 of NLRI included within the BGP update message.

In an embodiment of either the first or the second method implementing BGP, the indication that data from the first host to the second host is to be sent via the edge router of the first AS that received the first routing message may comprise an identification of the edge router of the first AS that received the first routing message being encoded in a NextHop field of the second routing message.

In other aspects, systems for implementing the methods described herein are provided.

Moreover, a computer program for carrying out the methods described herein, as well as a, preferably non-transitory, computer readable storage-medium storing the computer program are provided. A computer program may, for example, be downloaded (updated) to the existing network devices and systems (e.g. to the existing routers, switches, various control nodes, etc.) or be stored upon manufacturing of these devices and systems.

Since embodiments of the first method described herein are performed on the side of the destination AS of a forward route (i.e., the "first AS" described above) in terms of where the steps of the first method are performed, a functional network component performing embodiments of the first method described herein will be referred to in the following as a "Forward Route Destination AS (FRD) Logic." Similarly, since embodiments of the second method described herein are performed on the side of the source AS of a forward route (i.e., the "second AS" described above) in terms of where the steps of the second method are performed, a functional network component performing embodiments of the second method described herein will be referred to in the following as a "Forward Route Source AS (FRS) Logic."

As will be appreciated by one skilled in the art, aspects of the present disclosure, in particular the functionality of the FRD logic and of the FRS logic described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s) having computer readable program code embodied, e.g., stored, thereon.

Example Embodiments

Disclosed are, inter alia, methods, apparatus, data structures, computer-readable medium, mechanisms, and means for assisting in ensuring symmetric routing between a first host and a second host of different autonomous systems, which may be of particular use in BGP.

Routing Basics

The Internet may be viewed as a collection of Autonomous Systems, where an "Autonomous System" (AS) typically refers to a set of network elements, such as e.g. routers, switches, and controllers, under a single technical administration. The term "network elements" may refer to network devices and systems which could include not only actual physical devices and systems but also devices and systems implemented entirely in software and/or could also include virtual devices and systems components. An AS may also be considered to include hosts connected to the network. Segregation into different AS's allows defining administrative authorities and routing policies of different organizations.

Within an AS, network elements communicate with one another by routing packets using an interior gateway protocol (IGP) and by referring to certain common metrics. It has also become common to use several IGPs, such as e.g. Routing Information Protocol (RIP), Enhanced Interior Gateway Routing Protocol (EIGRP), Open Shortest Path First (OSPF) protocol, and Intermediate System-to-Intermediate System (IS-IS) protocol, and sometimes several sets of metrics within an AS.

Externally, neighboring AS's communicate with one another by routing packets using an Exterior Gateway Protocol (EGP), the current Internet standard EGP being the Border Gateway Protocol (BGP), one version of which is Version 4 (BGP-4) defined in RFC 4271, which is hereby incorporated by reference. Another version is described in A BORDER GATEWAY PROTOCOL 4 (BGP-4), draft-ietf-idr-bgp4-22, IETF working draft, October 2003, which is hereby incorporated by reference as well. Another document which describe aspects of Border Gateway Protocol includes DISSEMINATION OF FLOW SPECIFICATION RULES, RFC 5575, IETF, August 2009, which is also hereby incorporated by reference.

Each AS is "autonomous" (i.e., relatively independent from the other AS's) in a sense that is runs its own independent routing policies and unique IGPs. The use of the term "autonomous" also stresses the fact that, even when multiple IGPs and metrics are used, the administration of an AS appears to other ASs to have a single coherent interior routing plan and presents a consistent picture of what destinations are reachable through it. Exterior routing protocols were created to exchange routing information between different AS's. For example, the BGP defines an inter-AS routing protocol, where one of the primary functions is to exchange Network Layer Reachability Information (NLRI) by means of BGP speaking systems (also often referred to as "BGP speakers") sending update messages, described in greater detail below.

FIG. 1 is a simplified schematic diagram illustrating a network 100 comprising multiple AS's, according to an embodiment of the present disclosure. In the example of FIG. 1, two AS's are illustrated as a first AS 110 and a second AS 120.

The first AS 110 includes routers 112a-112f, each of which is operatively coupled to at least one other node within the first AS 110 as shown with solid lines between some of the routers 112a-112f. The solid lines between some of the routers 112a-112f may be viewed to represent exchange of packets according to one or more IGPs of the first AS 110, such as e.g. iBGP.

Similarly, the second AS 120 includes routers 122a-122g, each of which is operatively coupled to at least one other node within the second AS 120 as shown with solid lines between some of the routers 122a-122g. The solid lines between some of the routers 122a-122g may be viewed to represent exchange of packets according to one or more IGPs of the second AS 120, such as e.g. interior BGP (iBGP).

Routers in one AS that are configured to communicate with routers in other AS's are referred to as "edge routers", while routers in one AS that are only configured to communicate with other routes in the same AS are referred to as "core routers." In the illustration of FIG. 1, routers 112a, 112b, 112e, and 112f are edge routers, while routes 112c and 112d are core routers of the first AS 110, while, for the second AS 120, routers 122a, 122b, 122d, and 122f are edge routers and routes 122c, 122e, and 122g are core routers. In FIG. 1, the dashed lines between or extending from some of the edge routers may be viewed to represent exchange of packets according to an EGP, such as e.g. exterior BGP (eBGP).

Each of the edge routers is configured to communicate, via e.g. eBGP, with one or more edge routers in another AS. As an illustrative example, the edge routers may be service nodes (e.g. L3VPN, Layer 2 Virtual Private Network (L2VPN) endpoints) that exchange service state via BGP and Label Distribution Protocol (LDP).

A pair of edge routers from different AS's configured to communicate with one another are referred to as "EGP neighbors", e.g. "eBGP neighbors". In the illustration of FIG. 1, one pair of EGP neighbors includes routers 112b and 122b, while another pair of neighbors includes routers 112f and 122f. Other edge routers shown in FIG. 1 may also have their respective EGP neighbors in further AS's, which further AS's are not shown in FIG. 1.

As also shown in FIG. 1, each of the first AS 110 and the second AS 120 further includes a routing control node (RCN), shown in FIG. 1 as an RCN 114 for the first AS 110 and an RCN 124 for the second AS 120. An RCN may be viewed as a logical/functional entity, e.g. a Performance Routing (PfR) controller or a SDN controller, delivering intelligent route control for application-aware routing across the Wide Area Network (WAN). In particular, an RCN is configured to provide dynamic selection of appropriate routes (e.g. best routes) for application-based business policies. To that end, an RCN may have access to a route database and/or other data sources (e.g. third-party databases) (not shown in FIG. 1) comprising information that allows the RCN to generate a route. Such route database and/or other data sources maybe implemented as, e.g., SQL databases, MySQL databases, Hadoop databases, or may be any memory element (e.g., RAM, flash) accessible to an RCN.

In other, optional, embodiments, an RCN may also be configured to provide additional functionality such as e.g. application-based load balancing across routes for full utilization of bandwidth with improved network availability.

While RCNs 114 and 124 are shown in FIG. 1 as stand-alone entities, their functionality may be distributed over various nodes in their respective AS's. In general, an RCN may be a router, a switch, a server, or any other component capable of computing a route from a source to a destination within a WAN (e.g., the network 100), typically subject to one or more route computation constraints. In some examples, an RCN may be included within the AS (as is illustrated in the example of FIG. 1). However, in other embodiments, the RCN 114 and 124 may be included in respective entities located remote from the respective first and second AS (each of such RCNs is then still "associated" with a particular respective AS in that it is configured to perform functions for the respective designated AS). Since oftentimes a functionality of an RCN is distributed over one or more edge routers, expressions "RCN generating a policy/route" and "edge router generating a policy/route" are often used interchangeably.

In some implementations, an RCN may be responsible for generating policies and routes conforming to the policies within a respective AS. Such an RCN associated with one AS could not then control generation of policies and routes within another AS. For example, the RCN 124 may specify a route (i.e., a forward route) for providing packets from a certain host 126, e.g. a server system, within the second AS 120 to a certain host 116, e.g. a client system, within the first AS 110 as follows: 126-122f, meaning that the host 126 provides the packets to the edge router 122f (possibly via one or more core routers of the second AS 120 not shown in FIG. 1) (over IGP). Since the packets are destined for the first AS 110 and since, for the edge router 122f, the EGP neighbor in the first AS 110 is the edge router 112f, the edge router 122f will then transmit the packets, over EGP, to its' EGP neighbor 112f, which will then provide the packets to the host 126 (possibly over one or more core routers of the first AS 110 not shown in FIG. 1). Such a complete forward route from the host 126 to the host 116 is shown in FIG. 1 with an arrow 132.

Continuing with the implementation of an RCN described above, in current state of the art of this implementation, the reverse route from the host 116 to the host 126 would be controlled entirely by the RCN 114. The RCN 114 would identify a route according to its' considerations and policies at the time. For example, the RCN 114 could compute the reverse route to go from the host 116 to the core router 112c (via IGP), and then from the core router 112c to the edge router 112b (via IGP) of the first AS 110. Since the EGP neighbor of the edge router 112b in the second AS is the edge router 122b, such a complete return route from the host 116 to the host 126 may be as shown in FIG. 1 with an arrow 134. Thus, the above-described example of an RCN would result in asymmetric routing, which may be undesirable.

Symmetric Routing

As the foregoing description illustrates, in some implementations, while an RCN in a particular AS can control its' own policies and routes, it cannot control policies and routes of other AS's. As a result, if symmetric routing is desired, it is currently difficult to achieve.

A new EGP extension, in particular BGP extension to information included in update messages, presented in present specification, aims to improve on this problem of the current state of the art by providing policy-enforcement infrastructure to sync policies between different AS's. Embodiments of the present disclosure propose ensuring symmetric routing by implementing BGP Flow Specification—based route enforcement.

Figure 2:
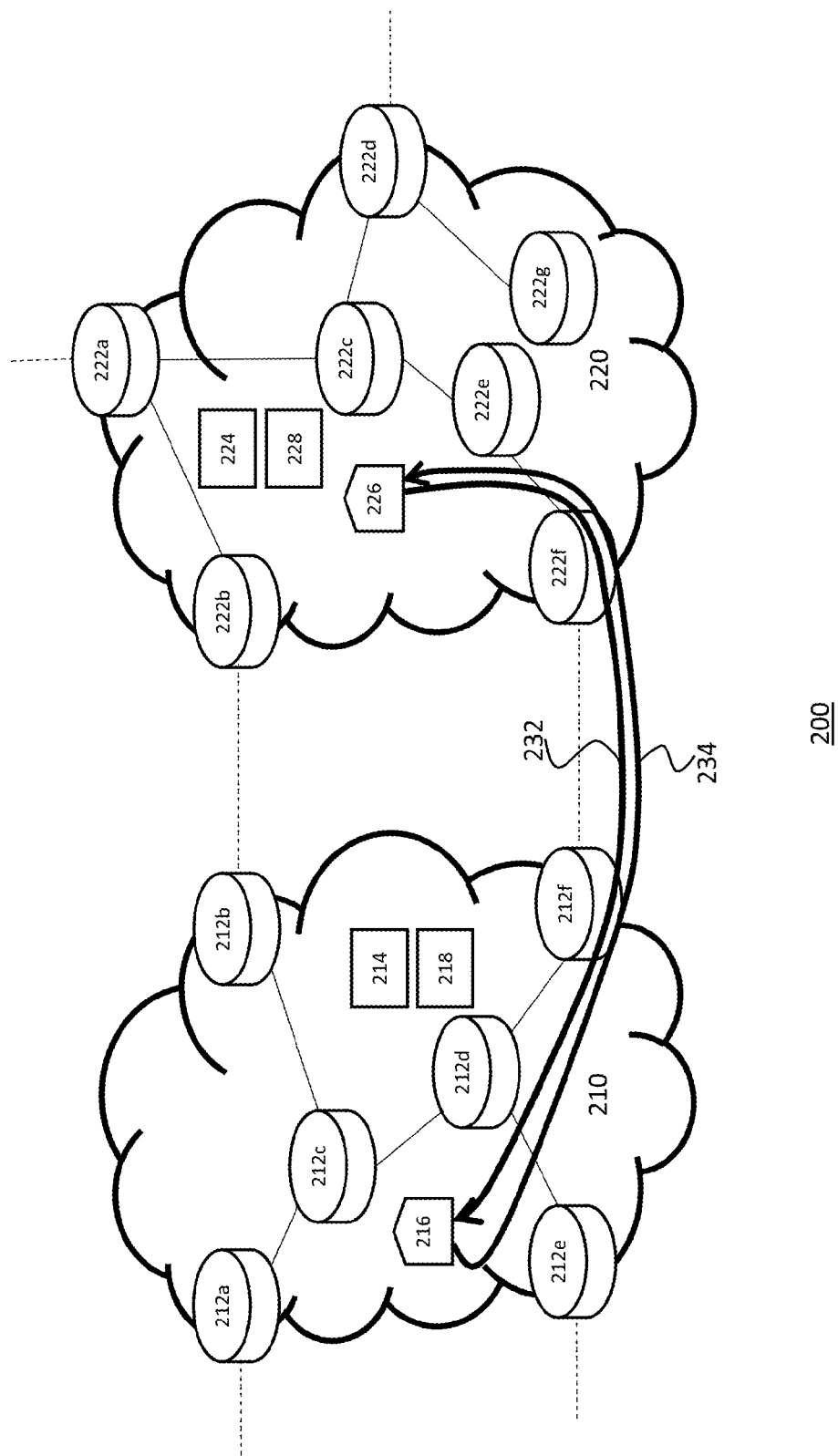
FIG. 2 is a simplified schematic diagram illustrating a network comprising multiple AS's capable of ensuring symmetric routing, according to an embodiment of the present disclosure.

To that end, two methods are proposed. The methods may be implemented in a network 200 shown in FIG. 2. Similar to FIG. 1, FIG. 2 is a simplified schematic diagram illustrating a network comprising multiple AS's. Elements 210, 212a-212f, 214, 216, 220, 222a-222g, 224, and 226 shown in FIG. 2 are analogous to, respectively, elements 110, 112a-112f, 114, 116, 120, 122a-122g, 124, and 126 shown in FIG. 1. Therefore, description of the elements shown in FIG. 1 are applicable to the corresponding elements shown in FIG. 2 (except for the description of how the reverse route is controlled) and, in the interests of brevity, this description is not repeated here. In contrast to the network 100, the network 200 is capable of ensuring symmetric routing by implementing the first and the second methods described herein. The first method is performed on the side of a destination AS of a forward route and is, therefore, described to be performed by a so-called Forward Route Destination (FRD) Logic, shown as FRD logic 218 in FIG. 2. The second method is performed on the side of a source AS of a forward route and is, therefore, described to be performed by a so-called Forward Route Source (FRS) Logic, shown as FRS logic 228 in FIG. 2. Note that the destination AS of a forward route is a source AS of a return route and that the source AS of a forward route is a destination AS of a return route.

The FRD logic 218 affects the functionality of the RCN 214 in that the FRD logic 218 controls the reverse route from the host 216 to the host 226. Continuing with the description of the forward route provided for FIG. 1, the FRD logic 218 would ensure that the reverse route would be from the host 216, via the edge router 212f to its' EGP neighbor 222f (over EGP) to the host 226.

In an embodiment, the FRD logic 218 could be implemented within the RCN 214 and/or the FRS logic 228 could be implemented within the RCN 218. Furthermore, while the FRD logic 218 and the FRS logic 228 are shown in FIG. 1 as stand-alone entities, their functionality may be distributed over various nodes in their respective AS's. In general, the FRD logic 218 may be a router, a switch, a server, or any other component capable of carrying out the first method for assisting in ensuring symmetric routing described herein. Similarly, in general, the FRS logic 228 may be a router, a switch, a server, or any other component capable of carrying out the second method for assisting in ensuring symmetric routing described herein. In some examples, the FRD logic 218 may be included within the first AS 210 and the FRS logic 228 may be included within the second AS 220 (as is illustrated in the example of FIG. 2). However, in other embodiments, the FRD logic 218 and/or the FRS logic 228 may be included in respective entities located remote from the respective first and second AS (each of such logics is then still "associated" with a particular respective AS in that it is configured to perform functions for the respective designated AS).

In addition, each AS may be associated with (e.g. comprise) both of the FRD logic 218 and the FRS logic 228, so that symmetric routing may be ensured independently of which AS is the original source.

BGP Update Messages and Flow Specification Rules

As mentioned above, a BGP speaker is used to exchange Network Layer Reachability Information (NLRI) with other BGP systems, NLRI being unique to BGP Version 4. The NLRI is exchanged between BGP routers in so-called "update messages" used to send routing updates to peers.

When a BGP session is initialized, update messages are sent until the complete BGP table has been exchanged. Every time an update message is received, the BGP routing table is updated and the BGP route table version is incremented by one. Thus, communicating network elements initially exchange their entire BGP routing table, and then send incremental updates, using update messages.

RFC 5575, described above, defines BGP NLRI encoding format that can be used to distribute traffic Flow Specifications (FS), which allows the routing system to propagate information regarding more specific components of the traffic aggregate defined by an IP destination prefix.

As explained in RFC 5575, modern IP routers contain both the capability to forward traffic according to IP prefixes as well as to take actions such as classify, shape, rate limit, filter, or redirect packets based on administratively defined policies. Traffic policy mechanisms allow the router to define match rules that operate on multiple fields of the packet header, where actions such as the ones described above can be associated with each rule.

RFC 5575 defines a general procedure to encode FS rules for aggregated traffic flows so that they can be distributed as a BGP (RFC4271 version) NLRI. By expanding routing information with flow specifications, the routing system can take advantage of the Access Control List (ACL) or firewall capabilities in the router's forwarding path.

RFC 5575 defines a FS NLRI type as an n-tuple consisting of several matching criteria that can be applied to IP traffic. The matching criteria can include elements such as source and destination address prefixes, IP protocol, and transport protocol port numbers. Some component types defined in RFC 5575 include the following:

Type 1: Destination Prefix
  Encoding: <type (1 octet), prefix length (1 octet), prefix>
  Defines the destination prefix to match
  Prefixes are encoded as in BGP update message, a length in bits is followed by enough octets to contain the prefix information
Type 2: Source Prefix
  Encoding: <type (1 octet), prefix-length (1 octet), prefix>
  Defines the source prefix to match
Type 3: IP Protocol
  Encoding: <type (1 octet), [op, value]+>
  Contains a set of {operator, value} pairs that are used to match the IP protocol value byte in IP packets
Type 4: Port
  Encoding: <type (1 octet), [op, value]+>
  Defines a list of {operation, value} pairs that matches source OR destination TCP/UDP ports
Type 5: Destination port
  Encoding: <type (1 octet), [op, value]+>
  Defines a list of {operation, value} pairs used to match the destination port of a TCP or UDP packet. Values are encoded as 1- or 2-byte quantities
Type 6: Source port
  Encoding: <type (1 octet), [op, value]+>
  Defines a list of {operation, value} pairs used to match the source port of a TCP or UDP packet
  Values are encoded as 1- or 2-byte quantities RFC 5575 further proposes a particular application of the encoding format defined therein, the proposed application providing traffic filtering, e.g. in the context of a BGP and multiprotocol label switching (MPLS) virtual private network (VPN) service. In particular, RFC 5575 proposes using the FS NLRI as defined above to also convey information about traffic filtering by defining a minimum set of filtering actions that is standardized as BGP extended community values as described in RFC4360, also hereby incorporated by reference. Among other values, RFC 5575 proposes using the following extended community value:

Type 0x8007: Traffic-action
Encoding: bitmask
The traffic-action extended community value consists of 6 bytes of which only the 2 least significant bits of the 6$^{th}$ byte (from left to right) are currently defined (i.e. bits 46 and 47), where bit 46 is defined as a "Sample" bit, enabling traffic sampling and logging for this FS and bit 47 is defined as "Terminal Action" bit, where, when this bit is set, the traffic filtering engine will apply any subsequent filtering rules (as defined by the ordering procedure) and, when this bit is not set, the evaluation of the traffic filter stops when this rule is applied.

BGP FS—Based Route Enforcement

Some embodiments operate in the context of BGP, where symmetric routing is ensured by implementing BGP FS—based route enforcement, and these embodiments are now described, with these teachings applicable to other embodiments and other protocols.

Embodiments are described with reference to FIGS. 3A-7 illustrating a first AS represented by an AS number (ASN) 1.1.1.1 and a second AS represented by an ASN 2.2.2.2. The first AS 1.1.1.1 illustrated in FIGS. 3A-7 could be the first AS 210 illustrated in FIG. 2, while the second AS 2.2.2.2 illustrated in FIGS. 3A-7 could be the second AS 220 illustrated in FIG. 2. The first AS 1.1.1.1 is illustrated in FIGS. 3A-7 to include three routers, shown as HUB-R1, HUB-R2, and HUB-R3, out of which routers HUB-R1 and HUB-R2 are edge routers (analogous to e.g. the edge routers 212b and 212f shown in FIG. 2) and router HUB-R3 is a core router (analogous to one of the core routers of the first AS 210 shown in FIG. 2). Similarly, the second AS 2.2.2.2 is illustrated in FIGS. 3A-7 to include three routers, shown as Branch-R1, Branch-R2, and Branch-R3, out of which routers Branch-R1 and Branch-R2 are edge routers (analogous to e.g. the edge routers 222b and 222f shown in FIG. 2) and router Branch-R3 is a core router (analogous to one of the core routers of the second AS 220 shown in FIG. 2). Each of SP1 and SP2 illustrated in FIGS. 3A-7 refer to an eBGP communication path between a respective pair of the edge routers in different ASs (i.e., a communication path of a flowpair).

Further, embodiments are described with reference to a second method 800 illustrated in FIG. 8 and a first method 900 illustrated in FIG. 9. Persons skilled in the art will recognize that even though the methods 800 and 900 are described with reference to the elements of the networks illustrated in FIGS. 2-7, any systems configured to carry out the steps of any of these methods, in any order, are within the scope of the present disclosure.

Assume e.g. that, initially, for the flow 1.1.1.1<--->2.2.2.2, the best route is over SP1. Assume also that the route should be changed to 1.1.1.1:80<--->2.2.2.2:any to SP2, e.g. by a software-defined network (SDN) controller.

Figures 3A, 3B:
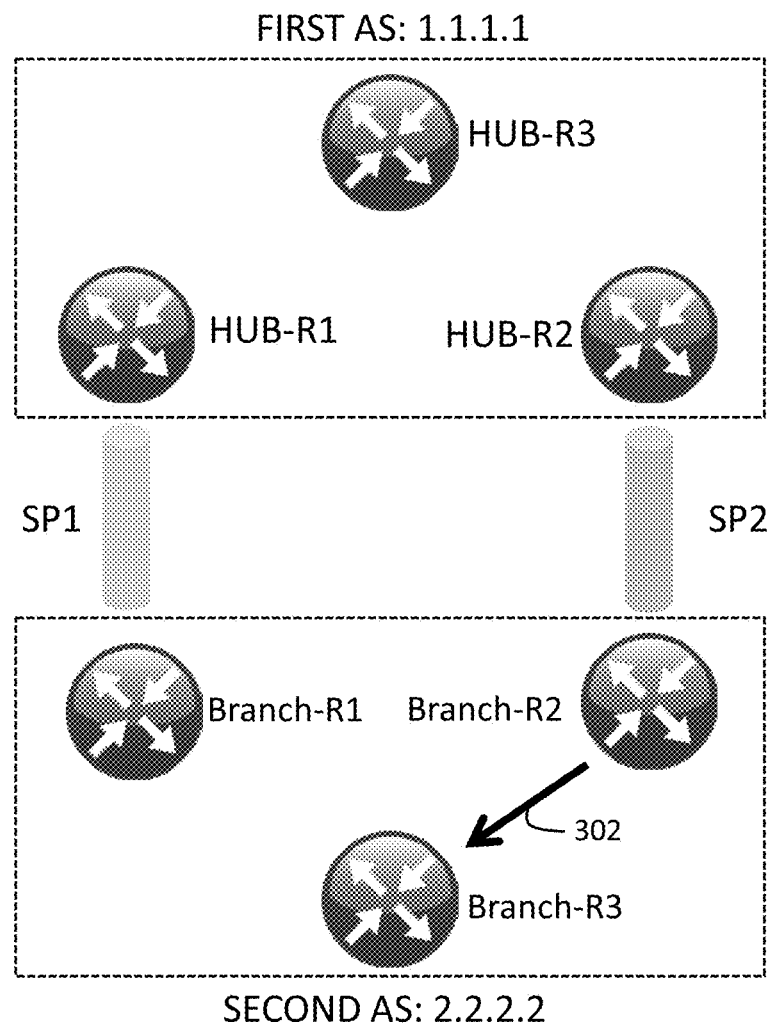
FIGS. 3A, 4A, 5A, and 6A are simplified schematic diagrams illustrating different stages of an approach to ensuring symmetric routing, according to an embodiment of the present disclosure.
FIGS. 3B, 4B, 5B, and 6B are simplified schematic diagrams illustrating routing messages used at the different stages of an approach to ensuring symmetric routing, according to an embodiment of the present disclosure.

The FRS logic 228 is then configured (in step 802 of the method 800 illustrated in FIG. 8), to generate a first routing message RM1, e.g. as a BGP FS update message shown in FIG. 3B. As illustrated in FIG. 3B, the message RM1 comprises the following components described above with reference to RFC 5575:

component of Type 2 encoding the source prefix with the value of 2.2.2.2/32
component of Type 6 indicating that any port of the AS 2.2.2.2 may be used
component of Type 1 encoding the destination prefix with the value of 1.1.1.1/32
component of Type 5 indicating that port 80 of the AS 1.1.1.1 is to be used
NextHop encoding an identification of Branch-R2 to indicate that routing from the second AS to the first AS is to be done over Branch-R2
Component of Type 0x8007 (referred to herein as "Obit" (optional bit)) comprising a set flag (i.e., a bit value set to 1) as an exemplary indication that symmetric routing is desired between the first host (1.1.1.1/32 in this example) and the second host (2.2.2.2/32 in this example)

The message RM1 is then sent from the Branch-R2 to the Branch-R3 (step 804 of the method 800), as shown in FIG. 3A with an arrow 302.

Figures 4A, 4B:
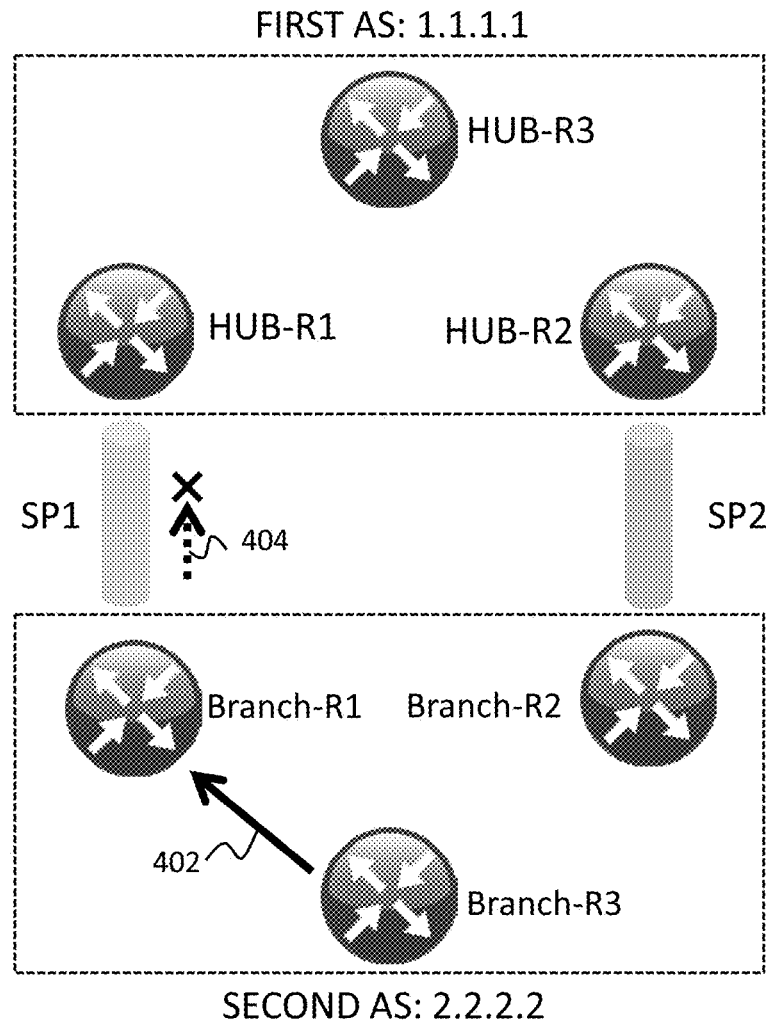

Branch-R3 is an iBGP neighbor of Branch-R2 and router reflector (RR) in Branch-AS (if considering the enterprise use confederation where each branch has a unique AS number). Branch-R3 will modify the Forwarding Information Base (FIB), also sometimes referred to as a Forwarding Table, and reflect the message RM1 to Branch-R1, as shown with an arrow 402 in FIG. 4A and with FIG. 4B illustrating the same message RM1 as that illustrated in FIG. 3B.

At this point, a rule is defined, where, if a router receives a message such as the RM1 from its iBGP peer (i.e., a message comprising an indication, in this example Obit set to 1, that symmetric routing is desired and indicating, in this case with NextHop, another router within that AS as the router over which the routing to the other AS should be done), then the receiving router will not forward data to eBGP neighbors to make sure this FS message is only effective in sub-AS. Thus, Branch-R1 will not forward to its eBGP neighbor HUB-R1, as shown in FIG. 4A with a dashed and crossed arrow 404.

Figures 5A, 5B:
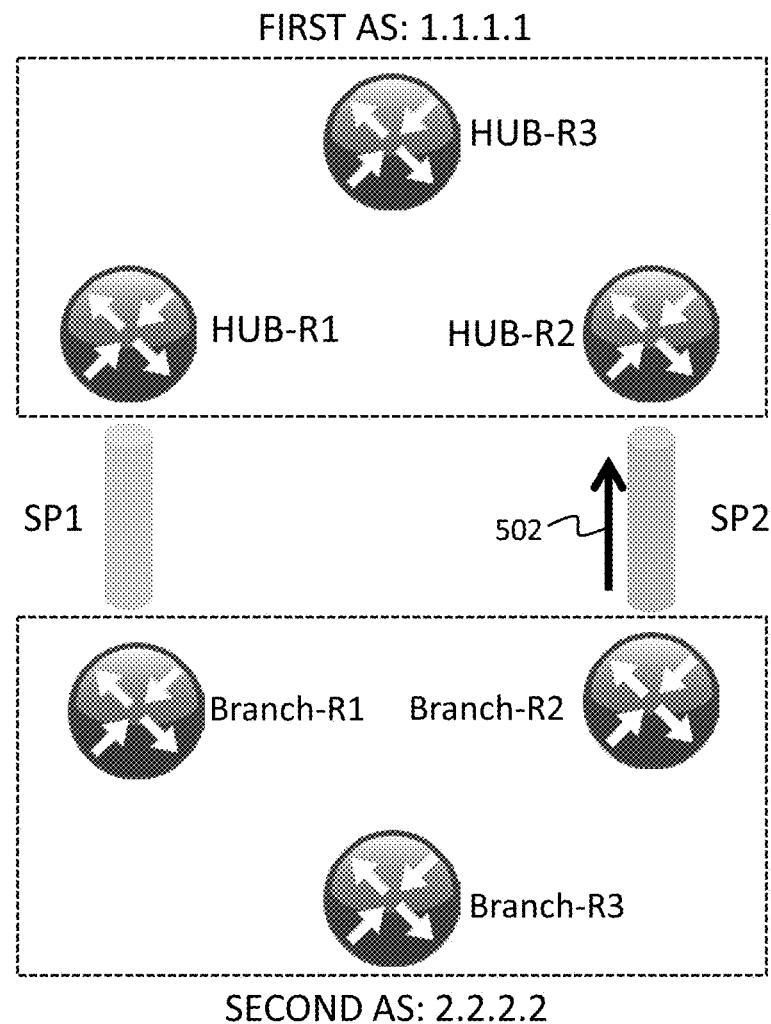

Only the original edge router could send data to its eBGP peer(s), as is shown in FIG. 5A with an arrow 502 illustrating that the original router Branch-R2 sends the message RM1 (shown in FIG. 5B illustrating the same message RM1 as that illustrated in FIGS. 3B and 4B) to its eBGP neighbor HUB-R2 (step 806 of the method 800 shown in FIG. 8).

At the first AS 1.1.1.1, in response to detecting that the message RM1 was received at the HUB-R2 from its eBGP neighbor Branch-R2 (step 902 of the method 900 shown in FIG. 9), the FRD logic 218 will check whether the received message RM1 contains an indication that symmetric routing is required. In this example, the FRD logic 218 will determine that the message RM1 contains Obit set to 1 (step 904 of FIG. 9). The FRD logic 218 will then generate a second routing message (step 906 of FIG. 9), illustrated as a message RM2 shown in FIG. 6B by reversing the source and destination information with respect to the first message RM1 and by including an indication that data from the first AS to the second AS is to be sent via the edge router of the first AS that received the first message RM1, the latter being done e.g. by setting HUB-R2 (i.e., the edge router of the first AS that received the first message RM1) as the NextHop. Thus, as illustrated in FIG. 6B, the message RM2 comprises the following components described above with reference to RFC 5575:

component of Type 2 encoding the source prefix with the value of 1.1.1.1/32
component of Type 6 indicating that port 80 of the AS 1.1.1.1 is to be used
component of Type 1 encoding the destination prefix with the value of 2.2.2.2/32 component of Type 5 indicating that any port of the AS 2.2.2.2 may be used

NextHop encoding an identification of HUB-R2 to indicate that routing from the first AS to the second AS is to be done over HUB-R2

Figures 6A, 6B:
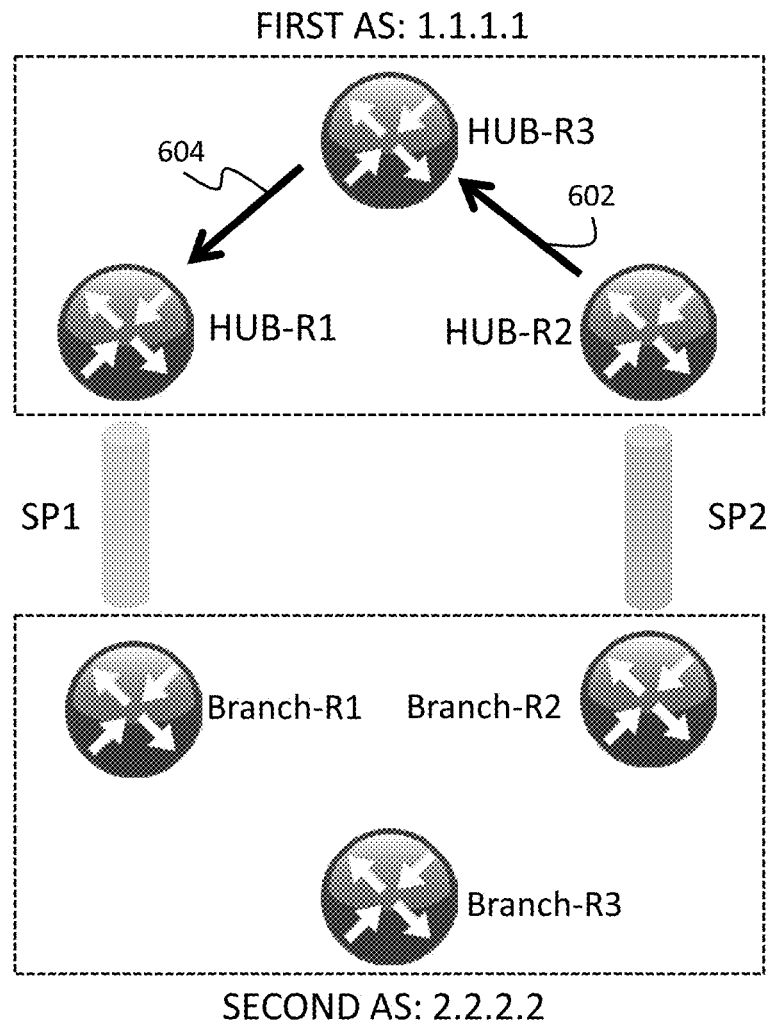

Component of Type 0x8007 (Obit) comprising a set flag (i.e., a bit value set to 1) as an exemplary indication that symmetric routing is desired The message RM2 is then sent from the HUB-R2 to its iBGP neighbors (step 908 of FIG. 9) HUB-R3 and HUB-R1, as shown in FIG. 6A with arrow 602 and 604, respectively. The router HUB-R2 will also update its FIB accordingly.

Figure 7:
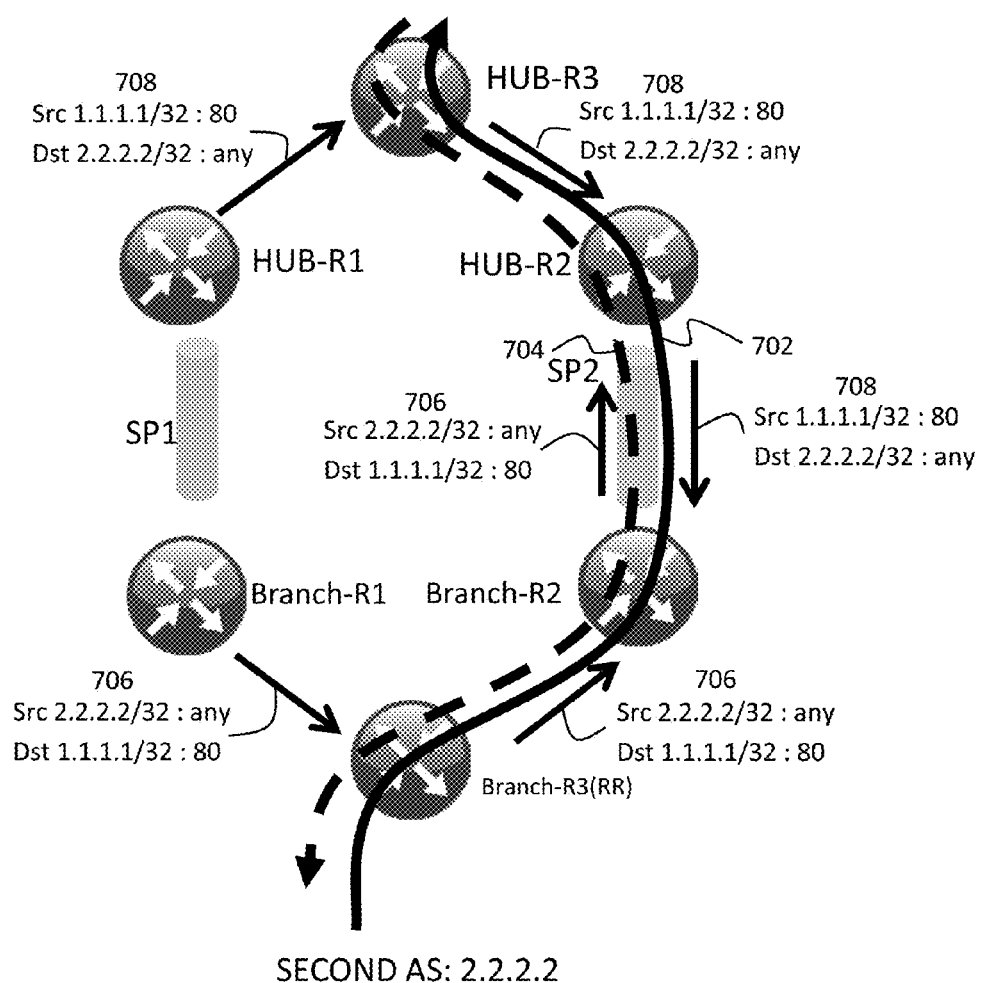
FIG. 7 is a simplified schematic diagram illustrating resulting symmetric routing when Obit is set to 1, according to an embodiment of the present disclosure.

FIG. 7 provides a result of implementing the steps described in association with FIGS. 3A-6B illustrating a cooperation of all routers of the first and the second AS in ensuring symmetric routing where one path (e.g. a forward path) is illustrated as a path 702 (solid line) and the opposite path (a return path) is illustrated as a path 704 (dashed line).

FIG. 7 also illustrates data traffic, in particular illustrating how, in one AS and in one direction, packets with a certain source and destination are distributed (e.g. packets 706 in the second AS, provided from the second AS to the first AS), while in the other AS and in the opposite direction, packets are distributed (e.g. packets 708 in the first AS, provided from the first AS to the second AS) with source and destination information reversed.

In this manner, BGP FS, that currently only supports "drop" and "ratelimit" cases for anti-DDOS Attacks, can be extended to support more Flow Action in order to get more flexible policy e.g. for SDN usage.

A branch site that has multiple WAN connections, with either a single router or multiple routers, is always prone to asymmetric routing. This can occur because the routing protocol on each end selects a different path, by load or session balancing, or even by path optimization mechanisms. The solution described herein provides policy enforcement by making sure that the dedicated flowpairs (5-turple) go through the same router, thus enabling symmetric routing when needed. BGP FS update will be sent to entire WAN segment and will allow the flowpairs to transport over the same link in case this is desired e.g. for some special bidirectional applications.

At the same time, the solution provided herein is flexible in that symmetric routing is only enforced when an indication that such routing is desired is included in a routing message (in the example illustrated herein by setting the Obit flag to 1). If symmetric routing is not desired, the Obit may be set to 0, in which case the FRD logic 218 will not generate and propagate the second routing message as described above (steps 906 and 908 of FIG. 9) and the flow can go in asymmetric routing (A-R) mode in order e.g. to fully use the WAN capacity.

Figure 10:
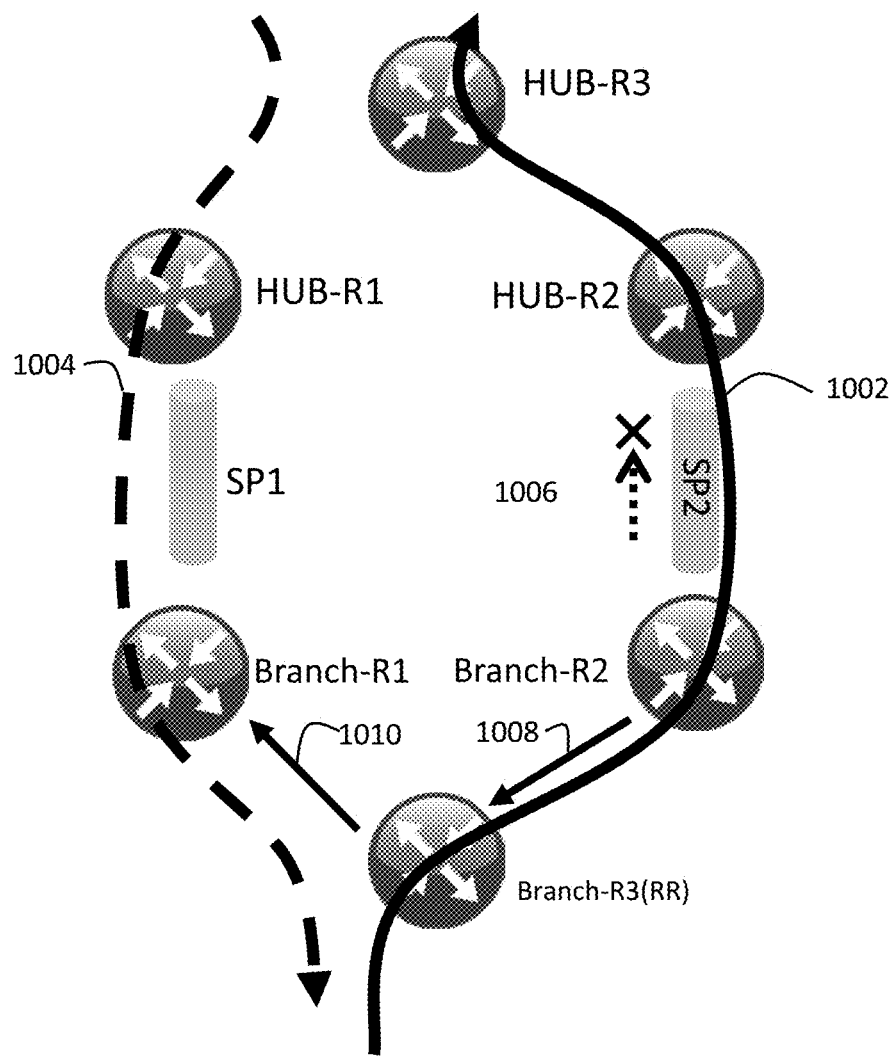
FIG. 10 is a simplified schematic diagram illustrating resulting possible asymmetric routing when Obit is set to 0, according to an embodiment of the present disclosure.

In an embodiment, if there is no indication that symmetric routing is desired, i.e. Obit of the first routing message is set to 0, then the first routing message will not be propagated from the edge router of second AS to the edge router of the firs AS (i.e., step 806 of FIG. 8 will not occur). Continuing with the example shown in FIGS. 3-7B, this situation is shown in FIG. 10 illustrating one path (e.g. a forward path) is as a path 1002 (solid line) and the opposite path (a return path) is illustrated as a path 1004 (dashed line), the return path going over a flowpair (SP1) different from that of the forward path (SP2). FIG. 10 also illustrates how a BGP FS update message 1006 is not provided from the second AS to the first AS. FIG. 10 further illustrates FS message updates 1008 and 1010 being exchanged within the second AS 2.2.2.2 only, to enforce the policy within that AS.

Figure 11:
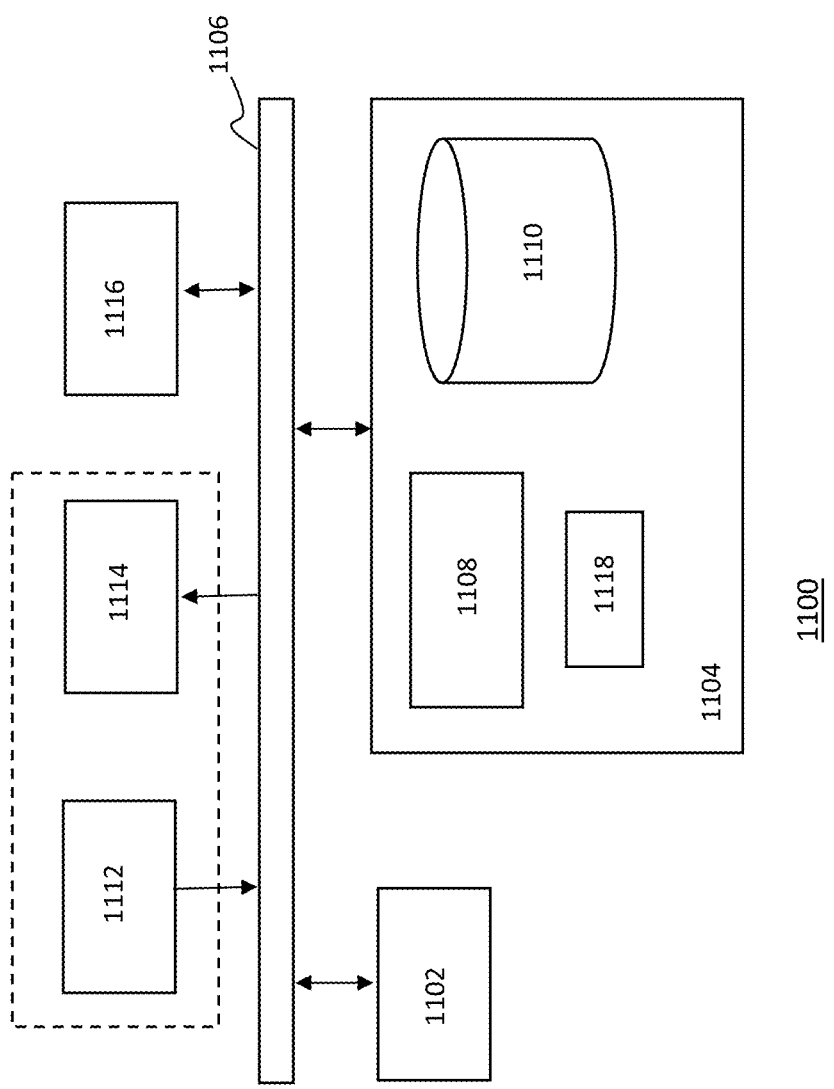
FIG. 11 depicts a block diagram illustrating an exemplary data processing system that may be used in a network as described with reference to FIG. 2, according to one embodiment of the present disclosure.

FIG. 11 depicts a block diagram illustrating an exemplary data processing system that may be used in a FRD logic 218 or FRS logic 228 as illustrated in FIG. 2.

As shown in FIG. 11, the data processing system 1100 may include at least one processor 1102 coupled to memory elements 1104 through a system bus 1106. As such, the data processing system may store program code within memory elements 1104. Further, the processor 1102 may execute the program code accessed from the memory elements 1104 via a system bus 1106. In one aspect, the data processing system may be implemented as a computer that is suitable for storing and/or executing program code. It should be appreciated, however, that the data processing system 1100 may be implemented in the form of any system including a processor and a memory that is capable of performing the functions described within this specification.

The memory elements 1104 may include one or more physical memory devices such as, for example, local memory 1108 and one or more bulk storage devices 1110. The local memory may refer to random access memory or other non-persistent memory device(s) generally used during actual execution of the program code. A bulk storage device may be implemented as a hard drive or other persistent data storage device. The processing system 1100 may also include one or more cache memories (not shown) that provide temporary storage of at least some program code in order to reduce the number of times program code must be retrieved from the bulk storage device 1110 during execution.

Input/output (I/O) devices depicted as an input device 1112 and an output device 1114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 1112 and the output device 1114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1100, and a data transmitter for transmitting data from the data processing system 1100 to said systems, devices and/or networks. Modems, cable modems, and Ethernet cards are examples of different types of network adapter that may be used with the data processing system 1100.

As pictured in FIG. 11, the memory elements 1104 may store an application 1118. In various embodiments, the application 1118 may be stored in the local memory 1108, the one or more bulk storage devices 1110, or apart from the local memory and the bulk storage devices. It should be appreciated that the data processing system 1100 may further execute an operating system (not shown in FIG. 11) that can facilitate execution of the application 1118. The application 1118, being implemented in the form of executable program code, can be executed by the data processing system 1100, e.g., by the processor 1102. Responsive to executing the application, the data processing system 1100 may be configured to perform one or more operations or method steps described herein.

In one aspect of the present disclosure, the data processing system 1100 may represent a client data processing system. In that case, the application 1118 may represent a client application that, when executed, configures the data processing system 1100 to perform the various functions described herein with reference to a "client". Examples of a client can include, but are not limited to, a personal computer, a portable computer, a mobile phone, or the like.

In yet another aspect, the data processing system 1100 may represent a server. For example, the data processing system may represent an (HTTP) server, in which case the application 1118, when executed, may configure the data processing system to perform (HTTP) server operations.

Persons skilled in the art will recognize that while the elements 1102-1118 are shown in FIG. 11 as separate elements, in other embodiments their functionality could be implemented in lesser number of individual elements or distributed over a larger number of components.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the symmetric routing operations thereof. This may be inclusive of appropriate algorithms and communication protocols that allow for the effective exchange of data or information.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

In one implementation, FRD logic 218 and FRS logic 228, as well as routers of the first AS 210 and of the second AS 220, and RCN's 214 and 224 described herein may include software to achieve (or to foster) the functions discussed herein for ensuring symmetric routing where the software is executed on one or more processors to carry out the functions. This could include the implementation of instances of routers of the first AS 210 and of the second AS 220, logic 218 and logic 228, RCN's 214 and 224 and/or any other suitable element that would foster the activities discussed herein. Additionally, each of these elements can have an internal structure (e.g., a processor, a memory element, etc.) to facilitate some of the operations described herein. In other embodiments, these functions for ensuring symmetric routing may be executed externally to these elements, or included in some other network element to achieve the intended functionality. Alternatively, FRD logic 218 and FRS logic 228, as well as routers of the first AS 210 and of the second AS 220, and RCN's 214 and 224 may include software (or reciprocating software) that can coordinate with other network elements in order to achieve the symmetric routing functions described herein. In still other embodiments, one or several devices may include any suitable algorithms, hardware, software, components, modules, interfaces, or objects that facilitate the operations thereof.

In certain example implementations, the symmetric routing functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable symmetric routing disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving symmetric routing, as outlined herein. Additionally, each of these devices may include a processor that can execute software or an algorithm to perform the activities for ensuring symmetric routing as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of ensuring symmetric routing, as potentially applied to a myriad of other architectures.

It is also important to note that the steps in the FIGS. 3A-10 illustrate only some of the possible scenarios that may be executed by, or within, FRD logic 218 and FRS logic 228, as well as routers of the first AS 210 and of the second AS 220, and RCN's 214 and 224 described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by FRD logic 218 and FRS logic 228, as well as routers of the first AS 210 and of the second AS 220, and RCN's 214 and 224 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for assisting in ensuring symmetric routing between a first host and a second host, the first host being a part of a first autonomous system (AS), the second host being a part of a second AS, the method comprising steps of:
   detecting that a first routing message was received at an edge router of the first AS from an edge router of the second AS, the first routing message comprising:
      an identification of the second host as a source of a forward route, and
      an identification of the first host as a destination of the forward route;
   determining that the first routing message further comprises an indication to implement symmetric routing between the first host and the second host;
   after the first routing message is received, generating a second routing message comprising:
      an identification of the first host as a source of a return route,
      an identification of the second host as a destination of the return route, and
      an indication that one or more routers within the first AS are to send data from the first host to the second host via the edge router of the first AS that received the first routing message; and
   configuring the one or more routers within the first AS to implement symmetric routing by propagating the second routing message to the one or more routers within the first AS.

2. The method according to claim 1, wherein the first routing message is an update message of an inter-domain routing protocol.

3. The method according to claim 2, wherein the inter-domain routing protocol is a Border Gateway Protocol (BGP).

4. The method according to claim 3, wherein the indication to implement symmetric routing between the first host and the second host comprises a predefined value encoded within a traffic-action value field of the update message.

5. The method according to claim 3, wherein the indication that data from the first host to the second host is to be sent via the edge router of the first AS that received the first routing message comprises an identification of the edge router of the first AS that received the first routing message encoded in a NextHop field of the second routing message.

6. A system for assisting in ensuring symmetric routing between a first host and a second host, the first host being a part of a first autonomous system (AS), the second host being a part of a second AS, the system comprising:
   at least one memory configured to store computer executable instructions; and
   at least one processor coupled to the at least one memory and configured, when executing the instructions, to:
      detect that a first routing message was received at an edge router of the first AS from an edge router of the second AS, the first routing message comprising:
         an identification of the second host as a source of a forward route, and
         an identification of the first host as a destination of the forward route;
      determine that the first routing message further comprises an indication to implement symmetric routing between the first host and the second host;
      after the first routing message is received, generate a second routing message comprising:
         an identification of the first host as a source of a return route,
         an identification of the second host as a destination of the return route, and
         an indication that one or more routers within the first AS are to send data from the first host to the second host via the edge router of the first AS that received the first routing message; and
      configure the one or more routers within the first AS to implement symmetric routing by propagating the second routing message to the one or more routers within the first AS.

7. One or more non-transitory computer readable storage media encoded with software comprising computer executable instructions and when the software is executed operable to:
   detect that a first routing message was received at an edge router of a first Autonomous System (AS) from an edge router of a second AS, the first routing message comprising:
      an identification of a second host as a source of a forward route, and
      an identification of a first host as a destination of the forward route;
   determine that the first routing message further comprises an indication to implement symmetric routing between the first host and the second host;
   after the first routing message is received, generate a second routing message comprising:
      an identification of the first host as a source of a return route,
      an identification of the second host as a destination of the return route, and
      an indication that one or more routers within the first AS are to send data from the first host to the second host via the edge router of the first AS that received the first routing message; and
   configure the one or more routers within the first AS to implement symmetric routing by propagating the second routing message to the one or more routers within the first AS.

8. The method according to claim 1, wherein said edge router of the first AS and said edge router of the second AS form a flowpair of a Flow Specification.

9. The system according to claim 6, wherein the first routing message is an update message of an inter-domain routing protocol.

10. The system according to claim 9, wherein the inter-domain routing protocol is a Border Gateway Protocol (BGP).

11. The system according to claim 10, wherein the indication to implement symmetric routing between the first host and the second host comprises a predefined value encoded within a traffic-action value field of the update message.

12. The system according to claim 10, wherein the indication that data from the first host to the second host is to be sent via the edge router of the first AS that received the first routing message comprises an identification of the edge router of the first AS that received the first routing message encoded in a NextHop field of the second routing message.

13. The system according to claim 6, wherein said edge router of the first AS and said edge router of the second AS form a flowpair of a Flow Specification.

14. The one or more non-transitory computer readable storage media according to claim 7, wherein the first routing message is an update message of an inter-domain routing protocol.

15. The one or more non-transitory computer readable storage media according to claim 14, wherein the inter-domain routing protocol is a Border Gateway Protocol (BGP).

16. The one or more non-transitory computer readable storage media according to claim 15, wherein the indication to implement symmetric routing between the first host and the second host comprises a predefined value encoded within a traffic-action value field of the update message.

17. The one or more non-transitory computer readable storage media according to claim 15, wherein the indication that data from the first host to the second host is to be sent via the edge router of the first AS that received the first routing message comprises an identification of the edge router of the first AS that received the first routing message encoded in a NextHop field of the second routing message.

18. The one or more non-transitory computer readable storage media according to claim 7, wherein said edge router of the first AS and said edge router of the second AS form a flowpair of a Flow Specification.

\* \* \* \* \*